United States Patent [19]
Roach

[11] 3,949,185
[45] Apr. 6, 1976

[54] ANGLE ADJUSTMENT FOR METAL DISINTEGRATORS

[75] Inventor: Jere H. Roach, Rocky River, Ohio
[73] Assignee: Cammann Manufacturing Co., Inc., Cleveland, Ohio
[22] Filed: Jan. 15, 1975
[21] Appl. No.: 541,270

[52] U.S. Cl................. 219/69 R; 219/69 E; 90/17; 408/236
[51] Int. Cl.² ...................... B23K 9/16; B23C 1/12
[58] Field of Search ... 219/69 R, 69 E, 69 G, 69 M, 219/69 V, 68; 90/16, 17; 408/187, 188, 236, 237; 403/43, 44, 46, 87, 90, 172

[56] References Cited
UNITED STATES PATENTS

| | | | |
|---|---|---|---|
| 3,211,405 | 10/1965 | Fey et al. | 403/90 X |
| 3,629,540 | 12/1971 | Altfeld et al. | 219/69 E |
| 3,711,105 | 1/1973 | Johanson | 219/69 E |
| 3,806,691 | 4/1974 | Roach | 219/69 G |

*Primary Examiner*—Bruce A. Reynolds
*Attorney, Agent, or Firm*—Woodling, Krost, Granger & Rust

[57] ABSTRACT

An angle adjustment unit for mounting a disintegrator head to a support is disclosed comprising a first housing adapted for mounting to the support and a second housing adapted for receiving the disintegrator head. A nut including a nut body and an expanded portion is mounted to the second housing with the nut body journaling a housing aperture in the second housing and with the expanded portion engaging the second housing. A threaded member having external threads extends from the first housing. The nut is mounted on the threaded member for producing a frictional engagement between the first and second housings upon rotation of the nut in one direction to prevent relative rotation therebetween and for removing the frictional engagement between the first and second housings upon rotation of the nut in the opposite direction to enable relative rotation between the housings. The foregoing abstract is merely a resume of one general application, is not a complete discussion of all principles of operation or applications, and is not to be construed as a limitation on the scope of the claimed subject matter.

13 Claims, 4 Drawing Figures

ANGLE ADJUSTMENT FOR METAL DISINTEGRATORS

BACKGROUND OF THE INVENTION

1. Field of the Invention:

The invention relates to electric heating, cutting or disintegrating and more particularly to devices for mounting a disintegrator to a support.

2. Background of the Invention:

Various types of tool positioners which are adjustable about an axis have been known to the prior art. Such adjustable units have been used to position electrodes in disintegrators to enable welding current to burn away or disintegrate a broken drill or tap in a hole of a workpiece. In many cases a workpiece represents a substantial investment in both material and machining costs. It is therefore desirable to remove the broken drill or tap from such a partially completed workpiece.

In order to operate a disintegrator device it is imperative that the electrode be axially aligned relative to the hole containing the broken drill or tap. A rotatable locking unit between the support and the disintegrator head enables rotation of the disintegrator head with a limited amount of friction to axially align the disintegrator electrode with the hole. A quick lock mechanism is required for securing the orientation of the electrode. There have been such devices in the prior art but none of them have completely satisfied the conditions of the disintegrator art. For example, in many applications the disintegrator head must be electrically insulated from the support. In addition, the locking mechanism must be able to sustain the weight of the disintegrator head and then lock the orientation of the disintegrator head without causing movement thereof during the locking process. A further requirement of the disintegrator art is to provide 360 degree rotation for the disintegrator head. Therefore, an object of this invention is to provide a unit for mounting a disintegrator head to a support wherein locking is accomplished by the rotation of a nut without any eccentric element.

Another object of this invention is to provide a unit for mounting a disintegrator head to a support which may provide various frictional forces between a first and a second housing to allow accurate adjustment therebetween.

Another object of this invention is to provide a unit for mounting a disintegrator head to a support which is easily adaptable to existing disintegrator housings.

Another object of this invention is to provide a unit for mounting a disintegrator head to a support which is readily adaptable for insulating the disintegrator electrode from the support.

Another object of this invention is to provide a unit for mounting a disintegrator head to a support which is economical and reliable.

SUMMARY OF THE INVENTION

The invention may be incorporated into a unit for mounting a disintegrator head to a support, comprising in combination: a first housing adapted for mounting to the support and having a first housing surface; a second housing adapted for receiving the disintegrator head and having a second housing surface; one of said first and second housings having a housing aperture; a nut including a nut body with internal nut threads and having an expanded portion; means for mounting said nut to said one of said housings with said nut body journaling with said housing aperture and with said expanded portion engaging said one of said housings; a threaded member having member threads located on the outer surface thereof; means for mounting said threaded member to the other of said first and second housings; and means for mounting said nut on said threaded member with said nut threads engaging said member threads for producing frictional engagement between said first and second housing surfaces upon rotation of said nut in one direction to prevent relative rotation between said first and second housings and for removing said frictional engagement between said first and second housing surfaces upon rotation of said nut in the opposite direction to enable relative rotation between said first and second housings.

Other objects and a fuller understanding of this invention may be had by referring to the following description and claims, taken in conjunction with the accompanying drawings.

DESCRIPTION OF THE PREFERRED EMBODIMENT

Figure 1:
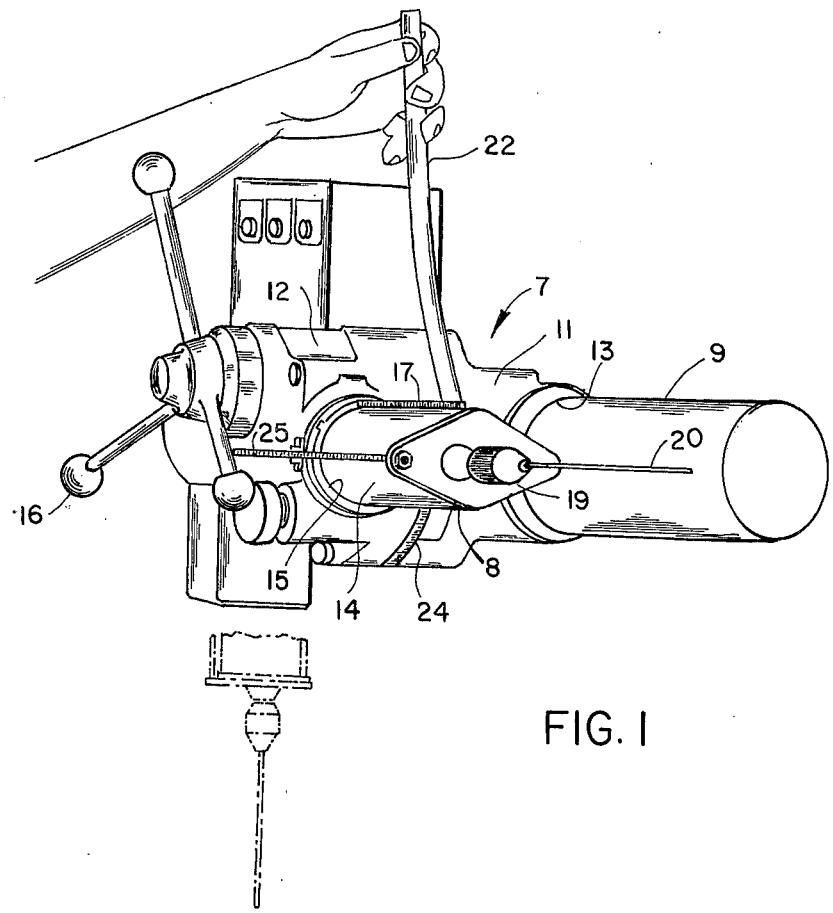
FIG. 1 is an isometric view of the invention.

FIG. 1 is an isometric view of a unit 7 for mounting between a disintegrator head 8 and a support 9 which unit 7 comprises a first and a second housing 11 and 12. The first housing 11 is adapted through aperture 13 for longitudinal movement along the support 9 and which may be locked in a given position by means not shown in FIG. 1. The second housing 12 is adapted through aperture 15 for receiving the disintegrator head 8. The disintegrator head 8 comprises a slide 14 which is longitudinally slidable within the housing 12 by a spoked handwheel 16 acting on a pinion (not shown) to move a rack 17 which is secured to the slide 14. A chuck 19 holds a tool shown as an electrode 20 positioned along an axis parallel to the longitudinal movement of slide 14. Rotation of the spoked handwheel 16 in one direction moves the electrode 20 toward the right in FIG. 1 whereas rotation of the spoked handwheel 16 in the other direction moves the electrode 20 toward the left in FIG. 1 along with movement of the slide 14 in aperture 15.

The first and second housings 11 and 12 are rotatably mounted to one another with means for preventing relative rotation between the first and second housings 11 and 12 upon movement of a lever 22 in a first direction and for enabling relative rotation between the first and second housings 11 and 12 upon movement of the lever 22 in the opposite direction. The partial disintegrator head and electrode shown in phantom in FIG. 1 illustrates a second position of the second housing 12 relative to the first housing 11 but it is understood that the second housing 12 may rotate 360 degrees relative to the first housing 11. A first scale 24 visually indicates the angular orientation of the second housing 12 relative to the first housing 11 whereas a second scale 25 visually indicates the longitudinal movement of the slide 14 relative to the second housing 12. The locking mechanism between the first and second housings 11 and 12 will be more fully explained in FIGS. 2–4.

Figure 2:
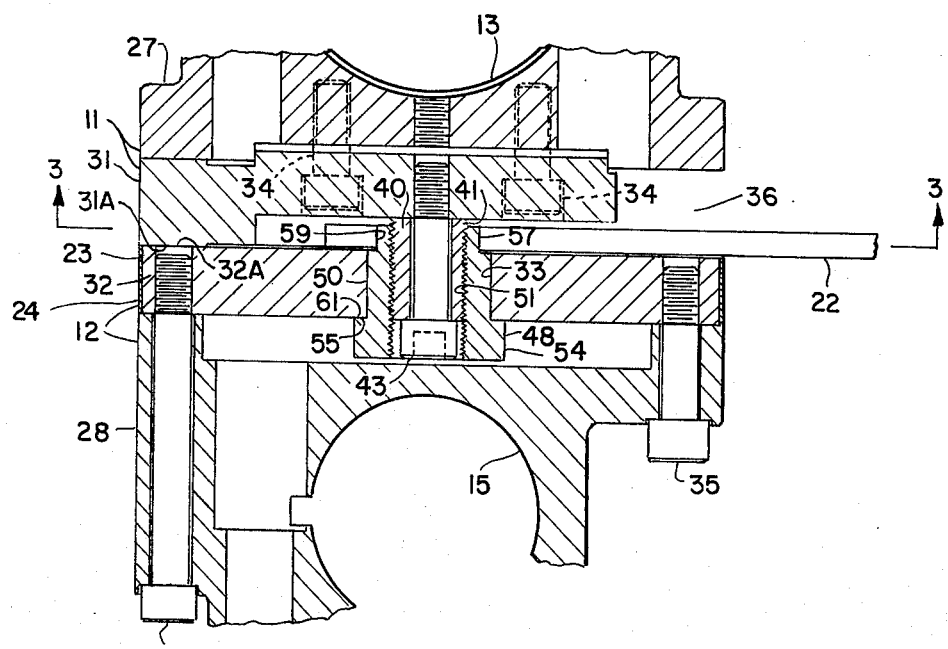
FIG. 2 is a partial vertical sectional view of the invention.
Figure 3:
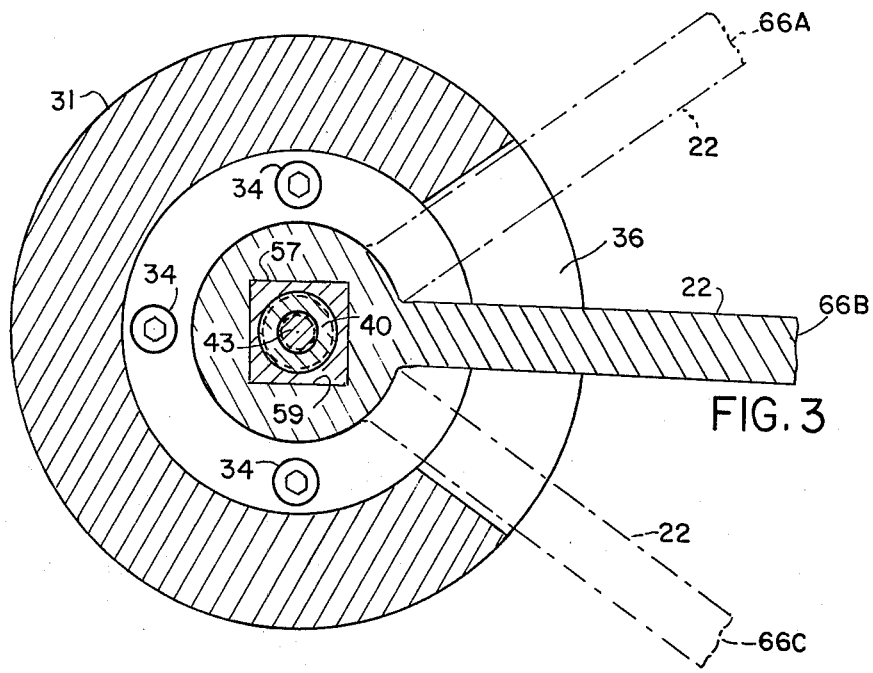
FIG. 3 is a sectional view along line 3-3 of FIG. 2.

FIG. 2 is a sectional view of a portion of the unit 7 shown in FIG. 1 illustrating the first housing 11 comprising a support mounting 27 including the aperture 13 for receiving the support 9 shown in FIG. 1 and a first housing plate 31 having a first housing surface 31A. The first housing plate 31 is secured to the support mounting 27 by conventional means shown as screws 34. The second housing 12 comprises a disintegrator head mounting 28 including the aperture 15 for receiving the disintegrator head 8 shown in FIG. 1 and a second housing plate 32 having a second housing surface 32A and a housing aperture 33. The second housing plate 32 is secured to the disintegrator mounting 28 by conventional means shown as screws 35. The first housing plate 31 includes a cutout 36 which is more clearly shown in FIG. 3 which cutout extends from a central aperture at diverging angles to the outer perimeter of the first housing plate 31. The cutout 36 may be located at any position about the first housing 11 or may be located in the second housing 12. FIG. 1 shows the cutout being located on the side of the first housing 11 to avoid accumulation of dirt and machine chips therein whereas FIG. 2 shows the cutout located on the upperside of the first housing 11. A calibration ring 23 includes the markings scale 24, see FIG. 1, is mounted to the second housing plate 32 to cooperate with a marker (not shown) on the first housing plate 31 for visually indicating the relative position between said first and second housings 11 and 12.

The invention includes a threaded member shown as a sleeve 40 having sleeve threads 41 on the outer surface of the sleeve 40. A socket head cap screw 43 mounts the sleeve 40 to the first housing 11 and more particularly to the first housing plate 31. A loosened socket head cap screw 43 enables relative movement in the form of rotation of the sleeve 40 relative to the first housing plate 31 to adjust the rotational position of the sleeve threads 41 relative to the first housing plate 31. A tightened socket head cap screw 43 prevents relative movement in the form of rotation of the sleeve 40 relative to the first housing plate 31 to fix the orientation of the sleeve threads 41 relative to the first housing plate 31. Accordingly, the orientation of the sleeve threads 41 relative to the first housing 11 can be easily adjusted to insure proper operation of the unit as will be hereafter described.

A nut 48 has a substantially cylindrical nut body 50 having internal nut threads 51. An expanded portion 54 forms a shoulder 55 with the nut body 50 on one end of the nut 48 with a keyed torque element 57 located on the other end of the nut 48. The nut 48 is mounted on the second housing plate 32 with the nut body 50 journaling with the housing aperture 33 of the second housing plate 32. The shoulder 55 of the expanded portion 54 engages a surface 61 of the second housing plate 32 with the keyed torque element 57 extending beyond the second housing surface 32A of the second housing plate 32. The keyed torque element 57 is mounted to a keyed aperture 59 of lever 22 to enable rotation of the nut 48 by movement of the lever 22. The nut 48 is mounted to the sleeve 40 with the nut threads 51 engaging the sleeve threads 41 and with the lever 22 located in the cutout portion 36 of the first housing plate 31. Movement of the lever 22 from position 66A to 66B in FIG. 3 rotates nut 48 relative to sleeve 40 to longitudinally displace the nut 48 towards the first housing plate 31 with the shoulder 55 pressing against the surface 61 of the second housing plate 32 to cause a frictional engagement between the first and second housing surfaces 31A and 32A. The frictional force caused by the lever 22 being in position 66B is sufficient to prevent relative rotation between the first and second housings 11 and 12. Movement of the lever 22 from the position 66B to the position 66A causes longitudinal displacement of the nut 48 away from the first housing 31 to remove the frictional force between the first and second housing surfaces 31A and 32A and between the shoulder 55 and the surface 61. The second housing 12 is now free to rotate about the nut body 50 relative to the first housing 11. Movement of the lever 22 between the positions 66A and 66B will cause a partial frictional force developed between the first and second housing surfaces 31A and 32A to provide a partial restraint to enable positioning of the disintegrator head 8 by the operator. As the unit wears with time, lever 22 will have to be rotated a greater distance to establish locking between the first and second housings 11 and 12. Accordingly, lever 22 may be moved beyond the original locked position 66B toward position 66C to compensate for the wear of the unit. When lever 22 must be moved to position 66C in order to establish locking between the first and second housing, the sleeve 40 may be adjusted relative to the first housing plate 31 to reestablish locking at position 66B.

Figure 4:
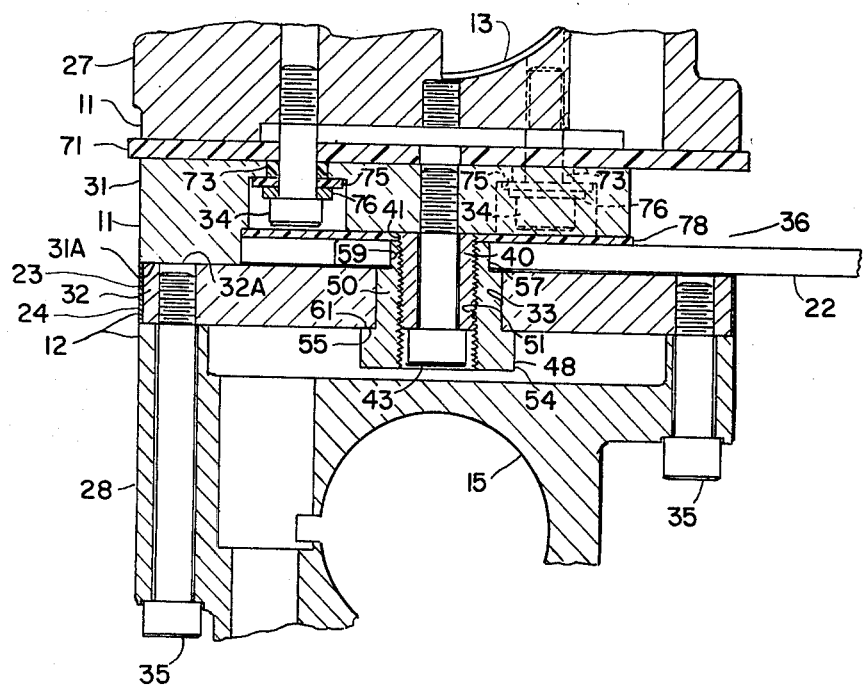
FIG. 4 is a view similar to FIG. 2 of an electrically insulated modification of the invention in FIG. 2.

FIG. 4 is a modification of the invention shown in FIG. 2 which includes means for insulating the disintegrator head from the support 9 shown in FIG. 1. An insulator 71 is mounted between the support mounting 27 and the first housing plate 31 of the first housing 11. Insulating bushings 73 and insulating washers 75 prevent the screws 34 and washers 76 from contacting the first housing plate 31 of the first housing 11. An insulating disc 78 covers the tops of screws 34. The structure shown in FIG. 4 is desirable when the disintegrator head 8 is to be insulated in proximity to housings 11 and 12, as opposed to insulation being inserted at some other place in the entire machine.

The invention has been described as a unit for mounting a disintegrator head 8 to a support 9 comprising a first housing 11 adapted for mounting to support 9 and having a first housing surface 31A. A second housing 12 is adapted for receiving the disintegrator head 8 and having a second housing surface 32A. One of the first and second housings 11 and 12 and which is shown as the second housing 12 in FIGS. 2 and 4 includes a housing aperture 33. A nut 48 including a nut body 50 with internal nut threads 51 has an expanded portion 54 and is mounted to one of the first and second housings 11 and 12 with the nut body 50 journaling with the housing aperture 33 and with the expanded portion 54 engaging the housing. A threaded member shown as a sleeve 40 has member threads 41 located on the outer surface thereof and is mounted to the other of the first and second housings shown as housing 11. The invention includes the nut 48 being mounted on threaded member 40 with the nut threads 51 engaging the member threads 41 for producing frictional engagement between the first and second housing surfaces 31A and 32A upon rotation of the nut 48 in one direction to prevent relative rotation between the first and second housings 11 and 12 and for removing the frictional engagement between the first and second housing surfaces 31A and 32A upon rotation of the nut 48 in an opposite direction to enable relative rotation between the first and second housings 11 and 12.

Although this invention has been described in its preferred form with a certain degree of particularity, it is understood that the present disclosure of the preferred form has been made only by way of example that numerous changes in the details of construction and the combination and arrangement of parts may be resorted to without departing from the spirit and scope of the invention as hereinafter claimed.

I claim:

1. A unit for mounting a disintegrator head to a support, comprising in combination:
   a first housing adapted for mounting to the support and having a first housing surface;
   a second housing adapted for receiving the disintegrator head and having a second housing surface;
   one of said first and second housings having a housing aperture;
   a nut including a nut body with internal nut threads and having an expanded portion;
   means for mounting said nut to said one of said housings with said nut body journaling with said housing aperture and with said expanded portion engaging said one of said housings;
   a threaded member having member threads located on the outer surface thereof;
   means for mounting said threaded member to the other of said first and second housings;
   and means for mounting said nut on said threaded member with said nut threads engaging said member threads for producing frictional engagement between said first and second housing surfaces upon rotation of said nut in one direction to prevent relative rotation between said first and second housings and for removing said frictional engagement between said first and second housing surfaces upon rotation of said nut in the opposite direction to enable relative rotation between said first and second housings.

2. A unit as set forth in claim 1, including means for enabling relative movement between one of said nut and said threaded member and said first and second housings to adjust said threads and for preventing relative rotation between said one of said nut and said threaded member and said first and second housings to fix the orientation of said threads.

3. A unit as set forth in claim 1, wherein said means for mounting said threaded member includes means for enabling relative movement between said threaded member and said other housing to adjust said member threads and for preventing relative movement between said threaded member and said other housing to fix the orientation of said member threads.

4. A unit as set forth in claim 1, wherein said first housing being adapted for mounting to the support includes means enabling linear movement of said first housing along the support.

5. A unit as set forth in claim 1, including a lever mounted to said nut for enabling rotation thereof.

6. A unit as set forth in claim 5, wherein one of said first and second housings has a cutout in said housing surface for receiving said lever.

7. A unit as set forth in claim 1, including means for visually indicating the position of said second housing relative to said first housing.

8. A unit as set forth in claim 1, wherein said one of said first and second housings includes a plate having said housing aperture therethrough with one side of said plate being said housing surface;
and said means for mounting said nut includes said expanded portion engaging the other side of said plate.

9. A unit as set forth in claim 8, wherein said nut includes a torque element which extends beyond said housing surface.

10. A unit as set forth in claim 1, including means for electrically insulating the disintegrator head from the support.

11. A nut for mounting a disintegrator head to a support, comprising in combination:
   a first housing adapted for linear movement along the length of the support;
   A first housing plate having a first housing surface;
   means for mounting said first housing plate to said first housing;
   a second housing adapted for receiving the disintegrator head;
   a second housing plate having a second housing surface with a central housing aperture therethrough;
   means for mounting said second housing plate to said second housing;
   one of said first and second housing plates having a diverging cutout portion extending from a central region to the perimeter of said housing plate;
   a sleeve having sleeve threads located on the outer surface thereof;
   means mounting said sleeve to said first housing plate for enabling relative movement between said sleeve and said first housing plate to adjust said sleeve threads and for preventing relative movement between said sleeve and said first housing plate to fix the orientation of said sleeve threads;
   a nut including a substantially cylindrical nut body having internal nut threads with an expanded portion on one end of said nut and a keyed torque element on the other end of said nut;
   a lever having a keyed end for cooperation with said torque element;
   means for mounting said nut to said second housing plate with said nut body journaling with said housing aperture and said torque element extending beyond said second housing surface and said expanded portion engaging the other side of said second housing plate;
   means mounting said keyed end of said lever to said keyed torque element of said nut with said lever being adjacent said second housing surface of said second housing plate;
   and means for mounting said nut on said sleeve with said nut threads engaging said sleeve threads and with said lever being located in said cutout portion for longitudinally displacing said nut toward said first housing plate to produce frictional engagement between said first and second housing plates upon movement of said lever in one direction through said cutout to prevent relative rotation between said first and second housings and for longitudinally displacing said nut away from said first housing plate to remove said frictional engagement between said first and second housing plates upon movement of said lever in the opposite direction through said cutout to enable relative rotation between said first and second housings.

12. A unit as set forth in claim 11, including an insulator mounted between one of said housings and said housing plates.

13. A unit as set forth in claim 11 including means for longitudinally moving the disintegrator head relative to said second housing.

* * * * *